US012589369B2

(12) United States Patent
Endo

(10) Patent No.: US 12,589,369 B2
(45) Date of Patent: Mar. 31, 2026

(54) FOAMING APPARATUS AND FOAMING METHOD

(71) Applicant: THREEBOND CO., LTD., Hachioji (JP)

(72) Inventor: Koichiro Endo, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 461 days.

(21) Appl. No.: 18/255,194

(22) PCT Filed: Dec. 3, 2021

(86) PCT No.: PCT/JP2021/044455
§ 371 (c)(1),
(2) Date: May 31, 2023

(87) PCT Pub. No.: WO2022/118953
PCT Pub. Date: Jun. 9, 2022

(65) Prior Publication Data

US 2024/0091722 A1 Mar. 21, 2024

(30) Foreign Application Priority Data

Dec. 3, 2020 (JP) ................................ 2020-201002

(51) Int. Cl.
*B01F 23/00* (2022.01)
*B01F 23/235* (2022.01)
(Continued)

(52) U.S. Cl.
CPC ............ *B01F 23/235* (2022.01); *B01F 25/51* (2022.01); *B01F 25/62* (2022.01); *B01F 33/811* (2022.01);
(Continued)

(58) Field of Classification Search
CPC ................ B01F 23/235; B01F 35/2209; B01F 2101/2805; B01F 25/51; B01F 33/811; B01F 25/62
See application file for complete search history.

(56) References Cited

U.S. PATENT DOCUMENTS 4,779,762 A 10/1988 Klein et al.
2001/0045233 A1 11/2001 Sulzbach et al.
(Continued)

FOREIGN PATENT DOCUMENTS

CN 107851773 A 3/2018
EP 1149674 A2 10/2001
(Continued)

OTHER PUBLICATIONS

Machine Translation of JP 2018127537A to Shotaro (Year: 2018).*
(Continued)

*Primary Examiner* — Anshu Bhatia
(74) *Attorney, Agent, or Firm* — LUCAS & MERCANTI, LLP

(57) ABSTRACT

According to the present invention, there is provided a foaming apparatus that discharges a foamable material obtained by mixing gas into a viscous material of a resin and dispersing bubbles in a liquid of the viscous material. The foaming apparatus includes: a pipe; a material supply unit; a gas supply unit; a first gear pump; a second gear pump; a third gear pump; a mixer; a discharge unit; and a control unit.

6 Claims, 5 Drawing Sheets

(51) Int. Cl.

| | |
|---|---|
| ***B01F 25/51*** | (2022.01) |
| ***B01F 25/62*** | (2022.01) |
| ***B01F 33/81*** | (2022.01) |
| ***B01F 35/22*** | (2022.01) |
| *B01F 101/00* | (2022.01) |

(52) U.S. Cl.
CPC .. *B01F 35/2209* (2022.01); *B01F 2101/2805* (2022.01)

(56) References Cited

U.S. PATENT DOCUMENTS

| | | | | |
|---|---|---|---|---|
| 2002/0063354 | A1* | 5/2002 | Sulzbach ................ | B29C 48/37 264/328.6 |
| 2007/0090130 | A1 | 4/2007 | Hidaka et al. | |
| 2018/0198113 | A1 | 7/2018 | Ono et al. | |
| 2020/0048067 | A1* | 2/2020 | Guernsey ............. | G05D 7/0676 |
| 2022/0355517 | A1 | 11/2022 | Endo | |

FOREIGN PATENT DOCUMENTS

| | | | |
|---|---|---|---|
| JP | 60-261570 | A | 12/1985 |
| JP | 2000-160109 | A | 6/2000 |
| JP | 2002-018853 | A | 1/2002 |
| JP | 2005-152710 | A | 6/2005 |
| JP | 2006-289276 | A | 10/2006 |
| JP | 2016-078304 | A | 5/2016 |
| JP | 2017109192 | A | 6/2017 |
| JP | 2018127537 | A | 8/2018 |
| WO | 2020105460 | A1 | 5/2020 |

OTHER PUBLICATIONS

European Patent Office, “Extended European Search Report” dated Jul. 26, 2024 in connection with the related European patent application No. 21900702.8, 8 pages.
Office Action which was issued by the European Patent Office and dated Jun. 3, 2025 in connection with the related European patent application No. 21900702.8, 5 pages.
Office Action, mailed Sep. 11, 2025, which was issued for the Chinese Patent Application No. 202180074930.X, 12 pages, with English Translation.
International Search Report mailed on Feb. 1, 2022 for the corresponding patent application No. PCT/JP2021/044455, with English translation, 4 pages.

* cited by examiner

FOAMING APPARATUS AND FOAMING METHOD

CROSS REFERENCE TO RELATED APPLICATION

This Application is a 371 of PCT/JP2021/044455 filed on Dec. 3, 2021, which claimed priority of Japanese Patent Application 2020-201002 filed on Dec. 3, 2020, both of which are incorporated herein by reference.

TECHNICAL FIELD

The present invention relates to a foaming apparatus and a foaming method.

BACKGROUND ART

In the related art, as an industrial seal material or a vibration-proof material, a foamed body obtained by foaming a foamable material obtained by mixing gas into a liquid such as a liquid resin to cause bubbles to be dispersed in the liquid and then curing or solidifying the foamable material has been used. As a method for generating the foamed body, a chemical foaming method in which two liquids such as a main agent and a curing agent are mixed and chemically foamed, and a mechanical foaming method in which gas is mechanically mixed into a one-part liquid are known.

In the chemical foaming method, a chemical reaction is used, and thus it is difficult to control a foaming expansion ratio due to the influence of environmental factors such as temperature, humidity, and a mixed state of two or more kinds of liquid agents. On the other hand, in the mechanical foaming method, it is less likely to be affected by the environmental factors since gas is mechanically mixed, and the foaming expansion ratio can be relatively easily controlled. For this reason, it is desirable to use the mechanical foaming method for the seal materials and vibration-proof materials used in electronic components, automobile components, and the like that require more accurate control of the foaming expansion ratio.

Examples of a mechanical foaming apparatus mainly includes a foaming apparatus with a plunger pump and a foaming apparatus with a gear pump. Since the gear pump type can quantitatively deliver a liquid, it is easy to control the foaming expansion ratio as compared with the plunger pump type.

For example, Patent Literature 1 below discloses a mechanical foaming apparatus with a gear pump, the mechanical foaming apparatus including two gear pumps disposed on a flow path through which a liquid resin is delivered, and a gas supply unit that supplies gas into the flow path through an inlet port provided in the flow path between the two gear pumps. In this apparatus, the rotation speed of a gear of each gear pump is controlled to generate suction pressure (negative pressure) in the flow path between the gear pumps, such that a desired amount of gas flows into the flow path. In order to control the foaming expansion ratio to an appropriate value, operation control is performed to adjust the suction pressure by controlling the rotation speed of each gear pump.

CITATION LIST

Patent Literatures

Patent Literature 1: JP 2005-152710 A

SUMMARY OF INVENTION

In a case where two pumps are installed on the flow path as in Patent Literature 1, a downstream pump needs to not only suck the liquid but also the gas necessary for foaming from the inlet port with a pressure difference, and thus needs to be rotated at a higher speed than the upstream pump. When the downstream pump is configured in this manner, a load applied to the downstream pump becomes relatively high. In such a case, there is a possibility that the mixture of liquid and gas fed from the downstream pump is fed back to an upstream side due to a fluctuation in the rotation speed, a fluctuation in the pressure, or the like of the downstream pump. As described above, due to the fact that the load is applied to the downstream pump, it is difficult for the liquid and the gas to be delivered at a constant ratio in the foaming apparatus, and it is difficult to obtain a stable foaming expansion ratio.

Therefore, an object of the present invention is to obtain a stable foaming expansion ratio in a foaming apparatus and a foaming method.

In order to solve the above-described problem, according to an aspect of the present invention, there is provided a foaming apparatus which discharges a foamable material obtained by mixing gas into a viscous material and dispersing bubbles in a liquid. The foaming apparatus includes a flow path, a material supply unit, a gas supply unit, a first gear pump, a second gear pump, a third gear pump, a mixer, a discharge unit, and a control unit. The flow path allows the viscous material and the gas to flow. The material supply unit supplies the viscous material to the flow path. The gas supply unit supplies the gas to the flow path. The first gear pump is disposed in the midway of the flow path. The second gear pump is disposed on the downstream side of the flow path with respect to the first gear pump, and is rotationally driven at a higher speed than the first gear pump, and thus the gas flows into the flow path and the viscous material containing the gas is fed to the downstream side of the flow path. The third gear pump is disposed on the downstream side of the flow path with respect to the second gear pump, and is rotationally driven at the same speed as the second gear pump, and thus the viscous material containing the gas is fed to the further downstream side of the flow path. The mixer is disposed on the downstream side of the flow path with respect to the third gear pump, and disperses the bubbles in the viscous material into the liquid of the viscous material. The discharge unit discharges the foamable material obtained by dispersing the bubbles in the liquid of the viscous material with the mixer. The control unit controls the discharge operation of discharging the foamable material.

Furthermore, according to another aspect of the present invention, there is provided a foaming method in which a foamable material obtained by mixing gas into a viscous material and dispersing bubbles in a liquid of the viscous material is generated. In the foaming method, among a first gear pump, a second gear pump, and a third gear pump, which are sequentially disposed from an upstream side to a downstream side of a flow path through which a viscous material and gas flow, the second gear pump is rotationally driven at a higher speed than the first gear pump. Then, a suction pressure is generated between the first gear pump 31 and the second gear pump in the flow path and the gas is mixed. Then, the third gear pump is rotationally driven at the same speed as the second gear pump to feed the viscous material containing the gas into a mixer that is disposed on the downstream side of the flow path with respect to the third gear pump and disperses bubbles in the viscous material into the liquid of the viscous material.

DESCRIPTION OF EMBODIMENTS

First Embodiment

Hereinafter, embodiments of the present invention will be described with reference to the accompanying drawings. Note that, the following description does not limit the technical scope or meaning of terms described in the claims. Furthermore, dimensional ratios of the drawings may be exaggerated for convenience of the description, and may be different from actual ratios.

(Foamable Material)

A foamable material M obtained by a foaming apparatus 100 and a mechanical foaming method according to the present embodiment is generated by mixing gas G into a liquid resin R (corresponding to a viscous material) and dispersing bubbles in a liquid of the viscous material to cause the gas G to be foamed (expanded).

The foamable material M can be applied to, for example electronic components which require airtightness, or a seal material and the like for waterproofing and dustproof of cylinder head covers and oil pans of automobiles. Furthermore, in addition to this, a foamed body is used to a panel in an engine room of an automobile and a potting of an electronic component, which are required to have a cushioning property, and the foamed body is used as a soundproofing material, a vibration-proofing material, a heat insulation material, etc of housing cases.

Note that in the present specification, a mixture obtained by mixing the gas G into the liquid resin R and dispersing bubbles in the liquid resin R is referred to as a foamable material M, and a state in which the foamable material M is discharged from the foaming apparatus 100 to the atmosphere and the gas G is foamed is referred to as a foamed body (foam). Furthermore, the liquid resin R before being cured or solidified is simply referred to as a resin R. Note that a state in which "gas is mixed in a resin" includes a state in which a resin and gas are alternately present in a pipe and a state in which the gas is finely dispersed in a resin.

Examples of the resin R include a room temperature curable composition such as a moisture curable composition or a two-liquid mixing curable composition, a thermosetting composition, and a photocurable composition such as an ultraviolet curable composition or a visible light curable composition. Furthermore, the resin R may be a material that is thermoplastic resin, and is melted through heating and solidified through cooling at room temperature. The resin R includes a resin that is cured, crosslinked, or solidified from a fluid state. Examples of the resin include a silicone resin, a modified silicone resin, an acrylic resin, a urethane acrylate resin, an epoxy resin, a polyurethane resin, polyester, polypropylene, polyethylene, polycarbonate, synthetic rubber, natural rubber, a synthetic resin, a natural resin, and the like. The resin R includes a resin referred to as an elastomer.

As the gas G, for example, nitrogen gas, carbon dioxide gas, air, or the like can be suitably used.

(Mechanical Foaming Apparatus)

Figure 1:
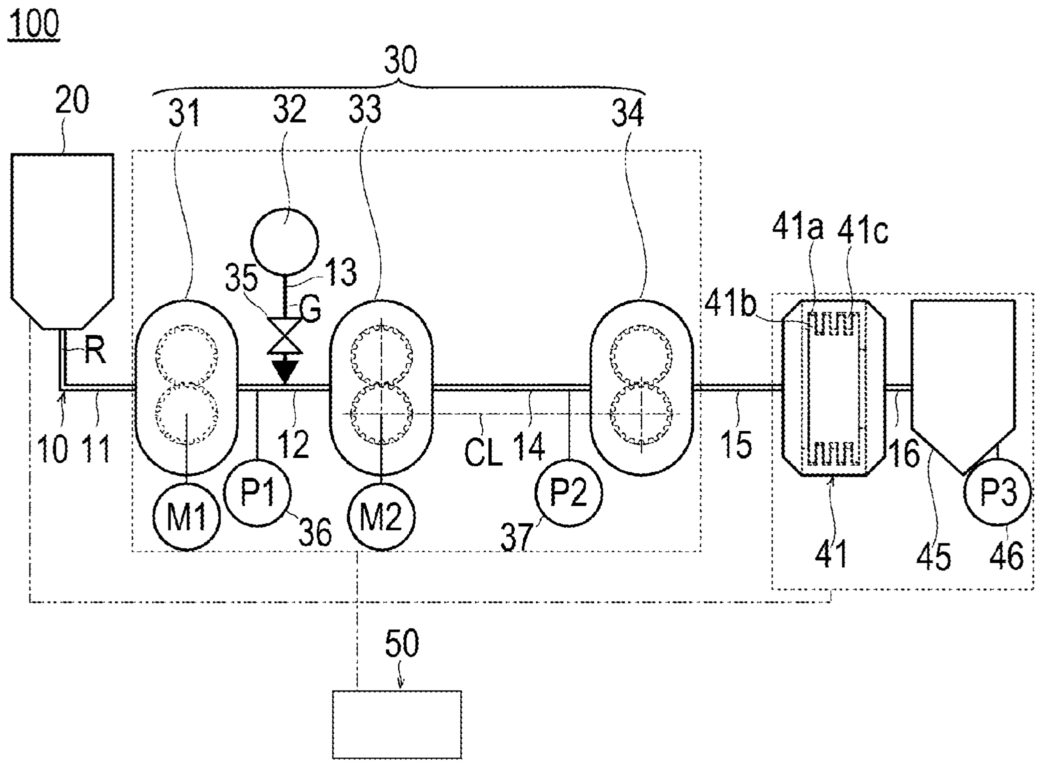
FIG. 1 is a view schematically illustrating a foaming apparatus according to a first embodiment of the present invention.

FIG. 1 schematically illustrates an overall configuration of the foaming apparatus 100. The foaming apparatus 100 generates the foamable material M obtained by mixing the gas G in the resin R and dispersing the bubbles in the liquid resin R, and generates a foamed body obtained by discharging and foaming the foamable material M.

In the schematic description with reference to FIG. 1, the foaming apparatus 100 according to the present embodiment includes a material supply unit 20, a pump unit 30, a mixer 41, a discharge unit 45, a third pressure sensor 46, and a control unit 50. Each unit of the apparatus is connected by a pipe 10 constituting a flow path for delivering the resin R and the gas G. Note that in the present specification, a side on which the material supply unit 20 is disposed is referred to as an upstream side, and a side on which the mixer 41 is disposed is referred to as a downstream side.

(Pipe)

The pipe 10 allows the resin R and the gas G to flow. As illustrated in FIG. 1, the pipe 10 includes a first pipe 11, a second pipe 12, a third pipe 13, a fourth pipe 14 (corresponding to a first region), a fifth pipe 15, and a sixth pipe 16.

The first pipe 11 connects the material supply unit 20 with a first gear pump 31 of the pump unit 30. The second pipe 12 connects the first gear pump 31 with a second gear pump 33 in the pump unit 30.

The third pipe 13 connects a gas supply unit 32 with the second pipe 12. The fourth pipe 14 connects the second gear pump 33 with a third gear pump 34, which constitute the pump unit 30. The fifth pipe 15 connects the third gear pump 34 of the pump unit 30 with the mixer 41.

The sixth pipe 16 connects the mixer 41 with the discharge unit 45. Note that the diameters of the first pipe 11 to the sixth pipe 16 are uniform, but for example, an on-off valve 35 may be provided on the second pipe 12 at a position close to the second gear pump 33. With this configuration, gas can be more easily drawn from the gas supply unit 32 to be described later. Furthermore, the foaming expansion ratio can be stabilized by providing a nozzle smaller than the diameter of the pipe.

The material forming the pipe is not particularly limited as long as it is a material that is hardly deformed by a pressure in the pipe 10, and for example, metal such as SUS can be suitably used.

(Material Supply Unit)

The material supply unit 20 supplies the resin R to the pipe 10. As illustrated in FIG. 1, the material supply unit 20 is connected to the first gear pump 31 of the pump unit 30 via the first pipe 11. The material supply unit 20 is composed of, for example, a tank for storing the resin R, a pump for pumping the resin R, a replaceable cartridge, a pail can, and the like.

(Pump Unit)

As illustrated in FIG. 1, the pump unit 30 includes a first gear pump 31, a gas supply unit 32, a second gear pump 33, a third gear pump 34, an on-off valve 35, a first pressure sensor 36, and a second pressure sensor 37.

The first gear pump 31 is disposed in the midway of the pipe 10. Specifically, the first gear pump 31 is disposed on the downstream side with respect to the material supply unit 20.

(Gas Supply Unit)

The gas supply unit 32 is disposed between the first gear pump 31 and the second gear pump 33, and supplies the gas G to the second pipe 12 and the third pipe 13, which constitute the pipe 10.

The gas supply unit 32 supplies the gas G to the pipe 10. The gas supply unit 32 pumps the gas G pressurized at a predetermined pressure or at an atmospheric pressure to the second pipe 12 and the third pipe 13. The gas supply unit 32 includes a gas tank that stores the gas G, and a gas supply port that is provided to be capable of delivering the gas G from the gas tank to the second pipe 12. The gas supply unit 32 uses the suction pressure generated in the second pipe 12 during the discharge operation as a suction pressure for sucking the gas G to supply the gas G to the second pipe 12. The foaming expansion ratio of a bubble can be adjusted by adjusting the pressure of the gas G supplied from the gas supply unit 32.

The second pipe 12 includes an inlet port provided such that the gas G delivered from the gas supply unit 32 can flow into the pipe 10. A part of the flow path of the second pipe 12 is configured such that the resin R and the gas G are mixed (including a state in which the resin R and the gas G are not blended).

The second gear pump 33 is disposed on the downstream side of the pipe 10 with respect to the first gear pump 31. The second gear pump 33 is rotationally driven at a higher speed than the first gear pump 31 to generate a suction pressure for causing gas to flow into the pipe 10 and feed the resin R containing the gas G to the downstream side of the pipe 10.

The third gear pump 34 is disposed on the downstream side of the pipe 10 with respect to the second gear pump 33. The third gear pump 34 is rotationally driven at the same speed as the second gear pump 33 to deliver the resin R containing the gas G to the further downstream side of the pipe 10.

The first gear pump 31, the second gear pump 33, and the third gear pump 34 can be composed of known gear pumps which include gears and convey a fluid through a space between teeth of each gear. The first gear pump 31, the second gear pump 33, and the third gear pump 34 respectively includes a drive gear and a driven gear that rotates following the drive gear.

The drive gear of the first gear pump 31 is configured to be driven by a motor M1. The drive gear of the second gear pump 33 is configured to be driven by a motor M2. The drive gear of the second gear pump 33 and the drive gear of the third gear pump 34 are configured to be coaxial as illustrated in an axis CL of FIG. 1. That is, the drive gear of the third gear pump 34 is configured to be driven by the same motor M2 driving the drive gear of the second gear pump 33.

In the gear pump, the conveyance amount is fixed and stable, and the conveyance amount of the fluid can be relatively easily adjusted by adjusting the rotation speed of the gear. As the gear pump, for example, an external type gear pump including two gears simultaneously driven rotationally due to meshing of teeth can be used.

During the discharge operation, the second gear pump 33 is rotationally driven at a higher speed than the first gear pump 31. The amount (volume) of the fluid caused to flow out from the second pipe 12 by the second gear pump 33 is greater than the amount (volume) of the fluid caused to flow into the second pipe 12 by the first gear pump 31. Therefore, in the second pipe 12, the suction pressure is generated according to the volume corresponding to the reduced amount of the resin R.

The on-off valve 35 is configured to be capable of switching a communication state between the second pipe 12 and the gas supply unit 32.

The on-off valve 35 is disposed between the gas supply port of the gas supply unit 32 and the second pipe 12, and is configured to open and close the inlet port.

The on-off valve 35 is configured to include a known needle valve. The on-off valve 35 includes a needle-shaped valve body in which a biasing force is applied in a valve closing direction of closing the inlet port, a piston connected to the valve body and moving the valve body in a valve opening direction of opening the inlet port, and a cylinder forming a housing space for housing the valve body and the piston. The housing space of the cylinder causes the gas supply port to communicate with the second pipe 12 via the inlet port. Note that the on-off valve 35 may be configured by a suck back valve or a ball valve in addition to the above-described valve.

During the discharge operation, as illustrated in FIG. 1, the first gear pump 31, the gas supply unit 32, the second gear pump 33, and the third gear pump 34 are driven, and the on-off valve 35 is opened to deliver the viscous material containing gas to the mixer 41.

The first pressure sensor 36 is configured to be capable of measuring (detecting) inter-pump pressure P1 (corresponding to a first pressure) between the first gear pump 31 and the second gear pump 33 in the second pipe 12.

The second pressure sensor 37 is configured to be capable of measuring (detecting) inter-pump pressure P2 (corresponding to a second pressure) between the second gear pump 33 and the third gear pump 34.

The mixer 41 is disposed on the downstream side of the pipe 10 with respect to the third gear pump 34, generates bubbles by stirring the resin R containing the gas G delivered by the third gear pump 34, and disperses the bubbles of the resin R in a liquid of the resin R to generate the foamable material M. The mixer 41 is disposed on the downstream side of the pipe 10 with respect to the third gear pump 34 and between the pump unit 30 and the discharge unit 45. As illustrated in FIG. 1, the mixer 41 includes a housing 41*a* and a rotor 41*b*.

As illustrated in FIG. 1, the housing 41*a* includes an inlet (not illustrated), an outlet (not illustrated), a mixing chamber (not illustrated), and a housing protrusion 41*c*. The inlet is configured to be capable of causing the resin R containing gas to flow from the pipe 10. The outlet is configured to be capable of deliver the foamable material M to the discharge unit 45. The mixing chamber is disposed between the inlet and the outlet, and forms a space for mixing the resin R containing gas.

A plurality of housing protrusions 41*c* are provided on the inner wall surface of the housing forming the mixing chamber. The housing protrusions 41*c* are alternately disposed at a space from the blades of the rotor 41*b* in an axial direction of the rotor 41*b*. The housing protrusions 41*c* are disposed at predetermined angular intervals in a circumferential direction of the inner wall surface of the mixing chamber formed in a substantially cylindrical shape.

In the present embodiment, the angular intervals of the housing protrusions 41*c* in the axial direction and the circumferential direction are set at equal intervals. However, the intervals between the housing protrusions 41*c* may not be disposed at equal intervals in both the axial direction and the circumferential direction as long as the properties of the foamed body are not affected. Furthermore, the mixer 41 is connected to a chiller (not illustrated), and thus the temperature in the mixer 41 can be adjusted.

The rotor 41*b* has a substantially cylindrical shape similarly to the shape of the mixing chamber. The rotor 41*b* is configured to be rotatable by a motor (not illustrated). The rotor 41*b* includes blades provided on a cylindrical side surface as illustrated in FIG. 1. The blades of the rotor 41*b* are disposed at predetermined intervals in the axial direction of the rotor 41*b* in a similar manner to the housing protrusions 41*c*.

Furthermore, a plurality of the blades of the rotor 41*b* are disposed at predetermined angular intervals in the circumferential direction of the rotor 41*b*. The intervals of the blades of the rotor 41*b* in the axial direction and the circumferential direction are set at equal intervals in the present embodiment. However, the intervals between the blades of the rotor 41*b* in the axial direction and the circumferential direction are not limited to equal intervals as long as the properties of the foamed body are not affected in a similar manner to the housing protrusions 41*c*.

The discharge unit 45 includes a nozzle that discharges, as a foamed body, the foamable material M generated by the mixer 41 dispersing bubbles in a liquid of the resin R, a main body having a communication path through which the foamable material M stirred by the mixer 41 is delivered to the nozzle, and an openable/closable discharge valve. The nozzle as a discharge port discharges the foamable material M generated by the mixer 41 dispersing bubbles in the liquid of the resin R. The discharge valve is preferably a needle valve, and the discharge port of the nozzle and the distal end of the needle valve are more preferably close to each other. The third pressure sensor 46 is configured to be capable of detecting (measuring) a pressure P3 of discharging the foamable material M immediately before discharge in the communication path.

(Control Unit)

The control unit 50 controls each unit of the apparatus to perform a discharge operation of discharging the foamable material M as a foamed body. Furthermore, the control unit 50 can control the discharge operation for the foamable material M when receiving a discharge signal from a user (discharge signal ON), and can performs control to stop the discharge operation when the discharge signal is not received (discharge signal OFF).

(Mechanical Foaming Method)

Hereinafter, a mechanical foaming method for generating a foamed body by using the foaming apparatus 100 will be described with reference to FIG. 2.

Figure 2:
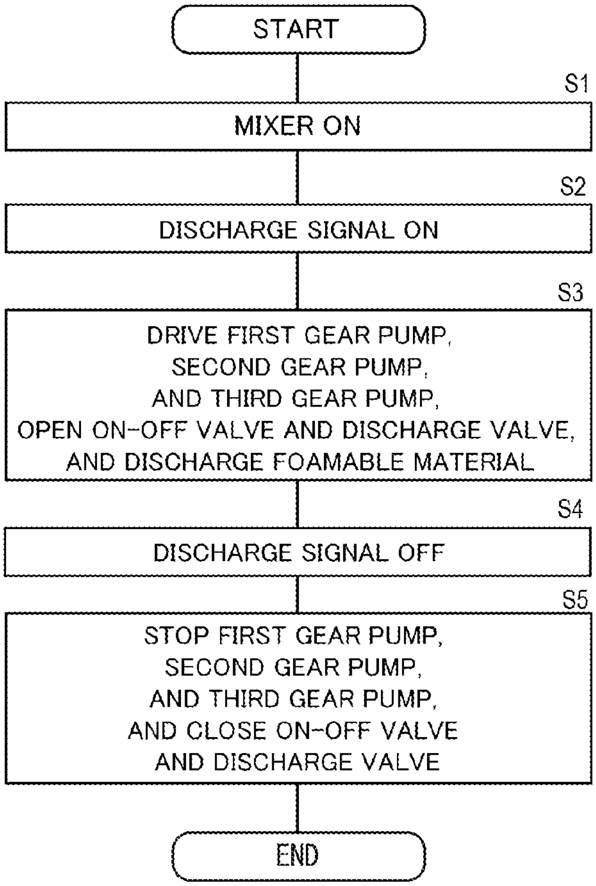
FIG. 2 is a flowchart illustrating a foaming method according to the first embodiment of the present invention.

FIG. 2 is a flowchart illustrating the mechanical foaming method according to the first embodiment of the present invention.

In the foaming method, gas G is mixed into a resin R to disperse bubbles in a liquid of the resin R, and then a foamable material M is generated. The foaming method generally includes discharging operations (S2 to S5), as illustrated in FIG. 2. Details thereof will be described below.

When the user turns on the power of the foaming apparatus 100, the control unit 50 operates the mixer 41 in an operation preparation state (S1). The mixer 41 can be in a state of being constantly operated at least during the operation preparation. Furthermore, the control unit 50 controls the material supply unit 20 to supply the resin R to the pipe 10.

Next, the control unit 50 receives a signal for starting control of the discharge operation of the foamable material M with the user's operation (discharge signal ON, S2).

Next, the control unit 50 rotationally drives the first gear pump 31 and the second gear pump 33 such that the rotation speed of the second gear pump 33 is higher than that of the first gear pump 31. Furthermore, the control unit 50 rotationally drives the third gear pump 34 at the same speed as the second gear pump 33 by utilizing that the second gear pump 33 and the third gear pump 34 are configured to be coaxial.

Accordingly, the amount of the resin R caused to flow out from the second pipe 12 by the second gear pump 33 become greater than the amount (volume) of the resin R caused to flow into the second pipe 12 by the first gear pump 31. Therefore, in the second pipe 12, the suction pressure is generated according to the volume corresponding to the reduced amount of the resin R.

Next, the control unit 50 opens the on-off valve 35 to cause the second pipe 12 to communicate with the gas supply unit 32. At this time, the gas G is sucked from the gas supply unit 32 with the suction pressure in the second pipe 12, and the gas G pumped and pressurized by the gas supply unit 32 or the gas G at the atmospheric pressure is mixed into the second pipe 12 through the third pipe 13.

Note that it is preferable that the first gear pump 31 and the second gear pump 33 are rotationally driven, and then the on-off valve 35 is opened after a predetermined period of time, for example, 0.1 to 0.5 seconds elapses. Accordingly, since the second pipe 12 and the gas supply unit 32 can communicate with each other in a state in which the suction pressure is generated in the second pipe 12, it is possible to suppress the resin R from flowing back to the gas supply unit 32.

Furthermore, since, by opening the on-off valve 35 after a predetermined period of time, the on-off valve 35 is opened after the pressure in the flow path between the first gear pump 31 and the second gear pump 33 becomes lower than the pressure of the supplied gas, thus the gas can be stably supplied.

The gas G drawn into the second gear pump 33 is delivered to the mixer 41 by the third gear pump 34 together with the resin R. The resin R containing gas pumped from the third gear pump 34 flows into the mixing chamber from the inlet of the mixer 41. The third gear pump 34 is controlled coaxially with the second gear pump 33 such that the resin R containing gas is fed into the mixer 41.

When the rotor 41*b* is rotated by the motor, the blades of the rotor 41*b* are rotationally driven around the axis of the rotor 41*b* to stir the resin R containing gas in the mixing chamber with the housing protrusion 41*c*. As a result, the gas G in the resin R is fined and dispersed with the shearing force, and the foamable material M is generated. The rotation speed of the rotor 41*b* can be set to, for example, 1 rpm to 100 rpm.

Next, the foamable material M generated by the mixer 41 is delivered from the outlet of the mixer 41 to the communication path included in the discharge unit 45. As a result, the foamable material M is discharged from the nozzle to the atmosphere via the communication path (S3). The gas G of the foamable material M discharged to the atmosphere is released from the pressurized state, the foamable material M is cured or solidified in an expanded and foamed state, and a foamed body is generated.

Note that for convenience of description, each operation in S3 of FIG. 2 has been described in time order, but actually, each operation may be performed almost simultaneously.

The control unit 50 performs control to stop the discharge operation when a signal indicating the operation of discharging the foamable material M is not received through the user's operation (discharge signal OFF) (S4). Accordingly, the control unit 50 performs control to stop the first gear pump 31, the second gear pump 33, and the third gear pump 34. Then, the control unit 50 performs control to close the on-off valve 35 and close the discharge valve of the discharge unit 45 (S5). Note that in the case of the continuous operation in which the discharge operation is continuously performed, the operation may return to S2 after S5, and the operations in S2 to S5 may be performed a predetermined number of times.

As described above, the foaming apparatus 100 according to the present embodiment discharges the foamable material M obtained by mixing the gas G into the resin R. and dispersing bubbles in the liquid of the resin R. The foaming apparatus 100 includes the pipe 10, the material supply unit 20, the gas supply unit 32, the first gear pump 31, the second gear pump 33, the third gear pump 34, the mixer 41, the discharge unit 45, and the control unit 50.

The pipe 10 allows the resin R and the gas G to flow. The material supply unit 20 supplies the resin R to the pipe 10. The gas supply unit 32 supplies the gas G to the pipe 10. The first gear pump 31 is disposed in the midway of the pipe 10.

The second gear pump 33 is disposed on the downstream side of the pipe 10 with respect to the first gear pump 31. When the second gear pump 33 is rotationally driven at a higher speed than the first gear pump 31, the gas G is caused to flow into the pipe 10 and the resin R containing the gas G is fed to the downstream side of the pipe 10. The third gear pump 34 is disposed on the downstream side of the pipe 10 with respect to the second gear pump 33, and is rotationally driven at the same speed as the second gear pump 33, and thus the resin R containing the gas G is fed to the further downstream side of the pipe 10.

The mixer 41 is disposed on the downstream side of the pipe 10 with respect to the third gear pump 34, and disperses the bubbles in the resin R into the liquid of the resin R. The discharge unit 45 discharges the foamable material M obtained by dispersing the bubbles in the liquid of the resin R with the mixer 41. The control unit 50 controls the discharge operation of discharging the foamable material M.

With this configuration, the load applied to the second gear pump 33 can be made unloaded or reduced. Therefore, the mixing ratio between the resin R and the gas G can be stabilized, and the foaming expansion ratio of the foamable material M discharged from the discharge unit 45 can be stabilized. Furthermore, since the foaming apparatus 100 includes the third gear pump 34 as well as the first gear pump 31 and the second gear pump 33, it is possible to stabilize the discharging at an initial operation without adjustment.

Furthermore, the drive gear of the third gear pump 34 is configured to be driven by the same motor M2 driving the drive gear of the second gear pump 33. Therefore, a pressure difference between the second gear pump 33 and the third gear pump 34 is not generated or can be made substantially zero. Therefore, by losing the load applied to the second gear pump 33 or by reducing the load applied to the second gear pump 33, it is possible to contribute to realization of a stable mixing ratio between the resin R and the gas G, which are discharged from the discharge unit 45.

Furthermore, in the foaming method according to the present embodiment, the gas G is mixed into the resin R to disperse bubbles in a liquid of the resin R, and then a foamable material M is generated. In the foaming method, among the first gear pump 31, the second gear pump 33, and the third gear pump 34, which are arranged in order from the upstream side to the downstream side of the pipe 10 through which the resin R and the gas G flow, the second gear pump 33 is rotationally driven at a higher speed than the first gear pump 31.

Then, the suction pressure is generated between the first gear pump 31 and the second gear pump 33 in the pipe 10 and the gas G is mixed. Then, the third gear pump 34 is rotationally driven at the same speed as the second gear pump 33 to feed the resin R containing the gas G into the mixer 41 that is disposed on the downstream side of the pipe 10 with respect to the third gear pump 34 and disperses bubbles in the liquid of the resin R.

Accordingly, the load applied to the second gear pump 33 can be made unloaded or reduced and the mixing ratio between the resin R and the gas G, which are discharged from the discharge unit 45, can be stabilized. Therefore, the foaming expansion ratio of the foamable material M can be stabilized.

(Modification Example of First Embodiment)

Figure 3:
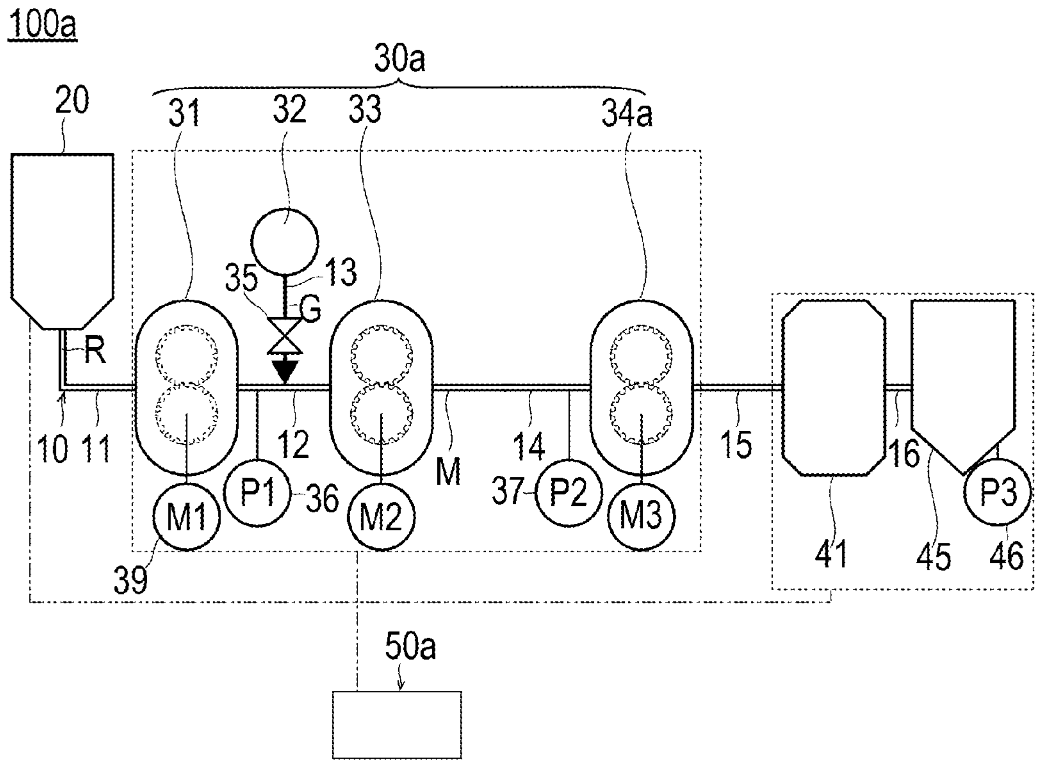
FIG. 3 is a view schematically illustrating a foaming apparatus according to a modification example of the first embodiment.

FIG. 3 is a view schematically illustrating a foaming apparatus 100*a* according to a modification example of the first embodiment. The foaming apparatus 100*a* is different from that of the first embodiment in that a drive gear of a third gear pump 34*a* is driven by a motor M3 unlike the drive gear of the second gear pump 33. Furthermore, a control unit 50*a* constituting the foaming apparatus 100*a* is different from that of the first embodiment in that each unit of the apparatus including the third gear pump 34*a* is controlled.

In the present modification example, the second gear pump 33 and the third gear pump 34*a* are not operated by the same motor M2, but the third gear pump 34*a* is operated by the motor M3 different from the motor M2. Similarly to the first embodiment, the control unit 50*a* controls each unit of the apparatus such that the second gear pump 33 and the third gear pump 34 operate in the same manner. Other matters are the same as those in the first embodiment, and thus the description thereof will be omitted.

Second Embodiment

Figure 4:
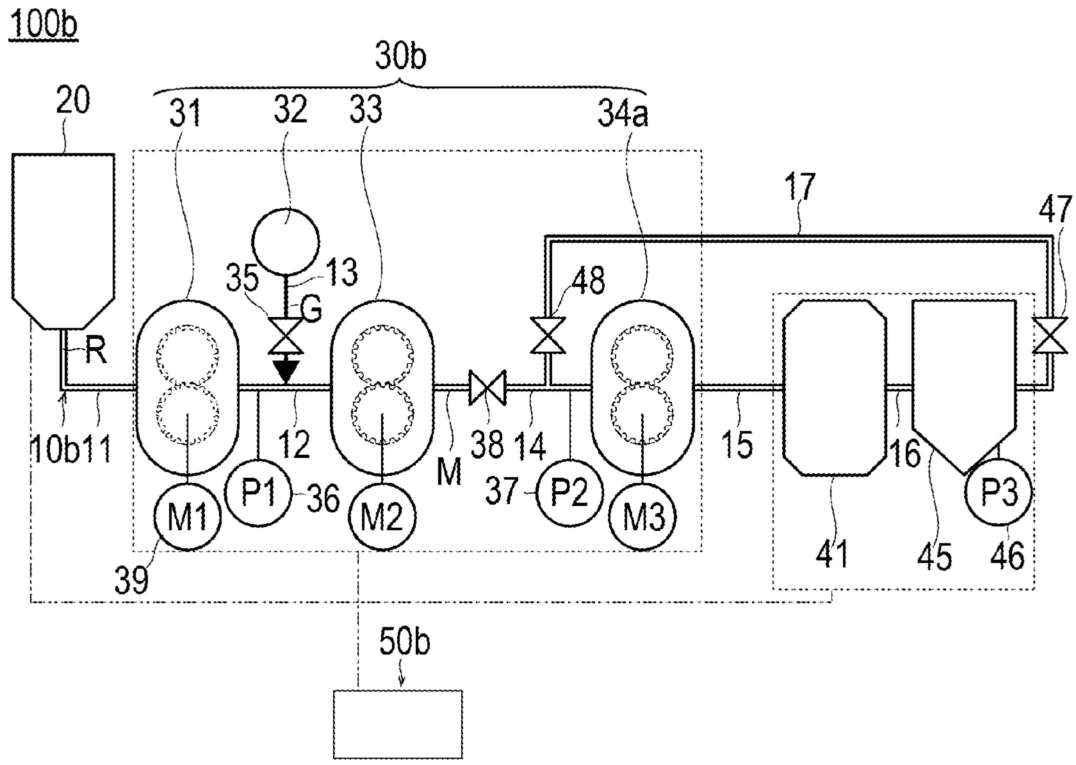
FIG. 4 is a view schematically illustrating a foaming apparatus according to a second embodiment.
Figure 5:
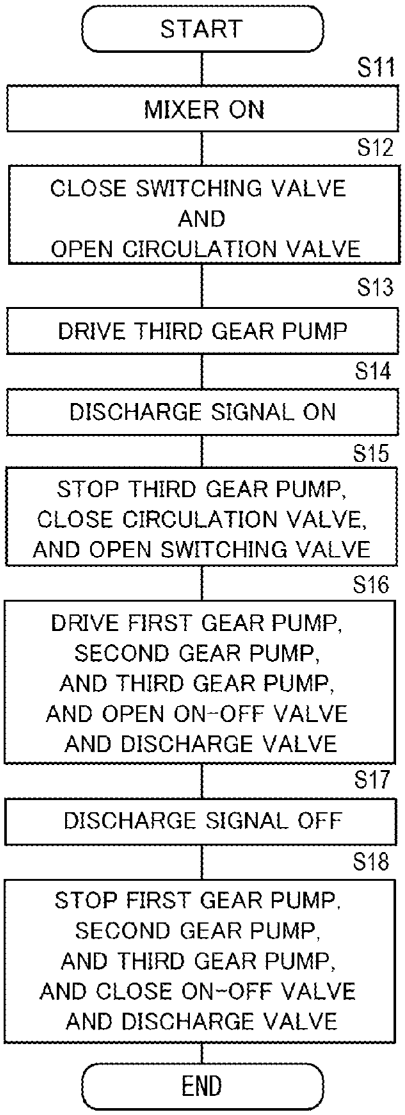
FIG. 5 is a flowchart illustrating a foaming method using the foaming apparatus of FIG. 4.

FIG. 4 schematically illustrates a foaming apparatus 100*b* according to a second embodiment of the present invention, and FIG. 5 is a flowchart illustrating a foaming method using the foaming apparatus 100*b* according to the second embodiment. The foaming apparatus 100*b* according to the second embodiment is different from the foaming apparatus 100 according to the first embodiment in that a circulation path is provided.

As illustrated in FIG. 4, the foaming apparatus 100*b* includes a pipe 10*b*, a material supply unit 20, a pump unit 30*b*, a mixer 41, a discharge unit 45, a third pressure sensor 46, circulation valves 47 and 48, and a control unit 50*b*.

(Pipe)

The pipe 10*b* includes a first pipe 11, a second pipe 12, a third pipe 13, a fourth pipe 14, a fifth pipe 15, a sixth pipe 16, and a seventh pipe 17. Since configurations of the first pipe 11 to the sixth pipe 16 are similar to the configuration of the pipe 10 of the foaming apparatus 100 of the first embodiment, the description thereof will be omitted.

The seventh pipe 17 connects a region on the downstream side of the discharge unit 45 with the fourth pipe 14 disposed in a first region between the second gear pump 33 and the third gear pump 34*a*. The fifth pipe 15, the sixth pipe 16, the seventh pipe 17, and a downstream side of a connection part between the fourth pipe 14 and the seventh pipe 17 correspond to a circulation path connecting a region between the second gear pump 33 and the third gear pump 34*a* in the present specification.

(Material Supply Unit)

Since the material supply unit 20 is similar to that of the foaming apparatus 100 of the first embodiment, the description thereof will be omitted.

(Pump Unit)

As illustrated in FIG. 5, the pump unit 30*b* includes a first gear pump 31, a gas supply unit 32, a second gear pump 33, a third gear pump 34*a*, an on-off valve 35, a first pressure sensor 36, a second pressure sensor 37, and a switching valve 38 (corresponding to a third valve).

Since the first gear pump 31, the gas supply unit 32, the second gear pump 33, the on-off valve 35, the first pressure sensor 36, and the second pressure sensor 37 are configured in a similar manner to the configuration of the foaming apparatus 100 according to the first embodiment, the description thereof will be omitted. The third gear pump 34*a* is configured to be operated by the motor M3 similarly to that of the foaming apparatus 100*a* according to the modification example of the first embodiment.

The switching valve 38 is disposed on the fourth pipe 14 corresponding to the first region between the second gear pump 33 and the third gear pump 34, and is configured to open and close the flow path between the second gear pump 33 and the third gear pump 34*a*.

The switching valve 38 is not particularly limited, but can be configured by a full-bore ball valve or the like having no (or less) flow path resistance.

(Mixer, Discharge Unit, Third Pressure Sensor, Circulation Valve)

Since the mixer 41, the discharge unit 45, and the third pressure sensor 46 are configured in a similar manner to the configuration of the foaming apparatus 100 of the first embodiment, the description thereof will be omitted. The circulation valve 47 corresponds to a first valve in the present specification, and the circulation valve 48 corresponds to a second valve.

The circulation valve 47 is disposed on the seventh pipe 17 constituting the circulation path. The circulation valve 48 is disposed on the downstream side with respect to the circulation valve 47 on the seventh pipe 17 constituting the circulation path.

(Control Unit)

The control unit 50*b* controls each unit of the apparatus so as to switch between the discharge operation and the circulation operation in the pipe 10*b* including the circulation path. At the time of the discharge operation, the control unit 50*b* closes the circulation valves 47 and 48, opens the switching valve 38, and drives the first gear pump 31, the second gear pump 33, and the third gear pump 34*a* to feed the resin R containing the gas G into the mixer 41.

At the time of the circulation operation, the control unit 50*b* controls each unit of the apparatus to close the switching valve 38, open the circulation valves 47 and 48, and drive the first gear pump 31, the second gear pump 33, and the third gear pump 34*a*. Accordingly, the resin R containing the gas G circulates in the circulation path and the mixer 41, and the foamed state of the foamable material M is maintained.

(Foaming Method)

Next, a foaming method using the foaming apparatus 100*b* according to the present embodiment will be described.

When the user turns on the power of the foaming apparatus 100*b*, the control unit 50*b* operates the mixer 41 in an operation preparation state (S11). Furthermore, the control unit 50*b* performs control to supply the resin R from the material supply unit 20 to the pipe 10*b*. Next, the control unit 50*b* performs control to close the switching valve 38 and open the circulation valves 47 and 48 (S12).

Next, the control unit 50*b* drives the third gear pump 34*a* (S13). Accordingly, the foamable material M in the circulation path circulates in the circulation path.

When the control unit 50*b* receives the discharge signal through the user's operation (discharge signal ON, S14), the control unit 50*b* performs control to stop the third gear pump 34*a*, close the circulation valves 47 and 48, and open the switching valve 38 (S15).

Next, the control unit 50*b* rotationally drives the first gear pump 31 and the second gear pump 33 such that the rotation speed of the second gear pump 33 is higher than that of the first gear pump 31. Furthermore, the control unit 50*b* rotationally drives the third gear pump 34*a* and the second gear pump 33 at the same speed.

Then, the control unit 50*b* performs control to open the on-off valve 35 and open the discharge valve of the discharge unit 45 (S16). Accordingly, the resin R containing the gas G is fed into the mixer 41 as in the first embodiment, and the foamable material M obtained mixing and dispersing the gas G in a resin M1 is generated and discharged from the nozzle of the discharge unit 45.

When the control unit 50*b* does not receive the discharge signal through the user's operation (discharge signal OFF, S17), the control unit 50*b* performs control to stop the first gear pump 31, the second gear pump 33, and the third gear pump 34*a*. Then, the control unit 50*b* performs control to close the on-off valve 35 and close the discharge valve of the discharge unit 45 (S18). Note that in the case of the continuous operation in which the discharge operation is continuously performed, the operation may return to S12 after S18, and the operations in S12 to S18 may be performed a predetermined number of times.

As described above, in the foaming apparatus 100*b* according to the present embodiment, the pipe 10*b* has the circulation path connecting a region on the downstream side of the discharge unit 45 and a first region between the second gear pump 33 and the third gear pump 34*a*. The foaming apparatus 100 includes the circulation valves 47 and 48 and the switching valve 38.

The circulation valve 47 is disposed on the seventh pipe 17 of the circulation path. The circulation valve 48 is disposed on the downstream side with respect to the circulation valve 47 of the circulation path. The switching valve 38 is disposed on the fourth pipe 14 which is the first region between the second gear pump 33 and the third gear pump 34*a*. At the time of the discharge operation, the control unit 50*b* closes the circulation valves 47 and 48, opens the switching valve 38, rotationally drives the third gear pump 34*a*, and feeds the foamable material M into the mixer 41.

Furthermore, at the time of the circulation operation, the control unit 50*b* opens the circulation valves 47 and 48, closes the switching valve 38, rotationally drives the third gear pump 34*a* to circulate the foamable material M in the circulation path and the mixer 41, and thus the foamed state of the foamable material M is maintained.

Therefore, a state in which the foamable material M is homogeneously dispersed in the circulation path constituting the pipe 10*b* can be maintained or can be easily maintained. Furthermore, it is possible to prevent or suppress a decrease in expansion ratio which may occur when the discharge of the foamable material M is stopped.

Note that the present invention is not limited to the above-described embodiments, and various modifications can be made within the scope of the claims. In the description above, the control units 50, 50*a*, and 50*b* receive the discharge signal through the user's operation, but the present invention is not limited thereto. In addition to the description above, the control unit may be configured to receive the discharge signal from another higher-level apparatus.

The present application is based on Japanese Patent Application No. 2020-201002 filed on Dec. 3, 2020, the content of which in its entirety is herein incorporated by reference.

REFERENCE SIGNS LIST

100, 100*a*, 100*b*: foaming apparatus
10, 10*b*: pipe (flow path)
14: fourth pipe (circulation path, first region)
15: fifth pipe (circulation path)
16: sixth pipe (circulation path)
17: seventh pipe (circulation path)
20: material supply unit
32: gas supply unit
31: first gear pump
33: second gear pump
34, 34*a*: third gear pump
38: switching valve (third valve)
41: mixer
45: discharge unit
47: circulation valve (first valve)
48: circulation valve (second valve)
50, 50*a*, 50*b*: control unit
M: foamable material
R: resin (viscous material)
G: gas
P1: inter-pump pressure (first pressure)
P2: inter-pump pressure (second pressure)

The invention claimed is:

1. A foaming apparatus that discharges a foamable material obtained by mixing gas into a viscous material and dispersing bubbles in a liquid of the viscous material, the foaming apparatus comprising:
- a flow path through which the viscous material and the gas flow;
- a material supply unit that supplies the viscous material to the flow path;
- a gas supply unit that supplies the gas to the flow path;
- a first gear pump that is disposed in a midway of the flow path;
- a second gear pump that is disposed on a downstream side of the flow path with respect to the first gear pump, is rotationally driven at a higher speed than the first gear pump to cause the gas to flow into the flow path, and feeds the viscous material containing the gas to the downstream side of the flow path;
- a third gear pump that is disposed on the downstream side of the flow path with respect to the second gear pump, and is rotationally driven at a same speed as the second gear pump to feed the viscous material containing the gas to a further downstream side of the flow path;
- a mixer that is disposed on the downstream side of the flow path with respect to the third gear pump, and disperses the bubbles in the viscous material into the liquid of the viscous material;
- a discharge unit that discharges the foamable material obtained by dispersing the bubbles in the liquid of the viscous material with the mixer; and
- a control unit that controls a discharge operation of discharging the foamable material,
- wherein the gas supply unit is connected to the flow path via a gas supply path, and the gas supply path is configured to flow the gas into the flow path by a suction pressure generated between the first gear pump and the second gear pump in the flow path.

2. The foaming apparatus according to claim 1, wherein a drive gear of the third gear pump is driven by a same motor driving a drive gear of the second gear pump.

3. The foaming apparatus according to claim 1, wherein a drive gear of the third gear pump is driven by a motor different from a motor driving a drive gear of the second gear pump.

4. The foaming apparatus according to claim 1, wherein, the flow path includes a circulation path connecting a region on the downstream side of the discharge unit and a first region between the second gear pump and the third gear pump,
- the foaming apparatus further comprises a first valve disposed on the circulation path, a second valve disposed on the downstream side of the circulation path with respect to the first valve, and a third valve disposed in the first region, and
- the control unit
- feeds the viscous material containing the gas to the mixer by closing the first valve and the second valve, opening the third valve, and rotationally driving the third gear pump at a time of the discharge operation, and
- circulates the viscous material containing the gas in the circulation path and the mixer by closing the third valve, opening the first valve and the second valve, and rotationally driving the third gear pump, and maintains a foamed state of the foamable material, at a time of the circulation operation.

5. The foaming apparatus according to claim 1, wherein the control unit controls each unit of the apparatus to control the discharge operation.

6. A foaming method for generating a foamable material obtained by mixing gas into a viscous material and dispersing bubbles in a liquid of the viscous material, the foaming method comprising:
- among a first gear pump, a second gear pump, and a third gear pump, which are sequentially disposed from an upstream side to a downstream side of a flow path through which the viscous material and the gas flow, rotationally driving the second gear pump at a higher speed than the first gear pump to generate a suction pressure between the first gear pump and the second gear pump in the flow path and mixing the gas; and rotationally driving the third gear pump at a same speed as the second gear pump to feed the viscous material containing the gas into a mixer that is disposed on the downstream side of the flow path with respect to the third gear pump and disperses bubbles in the viscous material into a liquid of the viscous material,
- wherein the gas is supplied from a gas supply unit connected to the flow path via a gas supply path, and the gas supply path is configured to flow the gas into the flow path by the suction pressure generated between the first gear pump and the second gear pump in the flow path.

* * * * *